United States Patent
Yoshizawa

(10) Patent No.: US 8,439,505 B2
(45) Date of Patent: May 14, 2013

(54) POSITION ADJUSTMENT AMOUNT CALCULATION METHOD OF LIGHT MODULATION DEVICE, POSITION ADJUSTMENT AMOUNT CALCULATION DEVICE OF LIGHT MODULATION DEVICE AND PROJECTOR

(75) Inventor: Koichi Yoshizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 13/114,380

(22) Filed: May 24, 2011

(65) Prior Publication Data

US 2011/0292352 A1 Dec. 1, 2011

(30) Foreign Application Priority Data

May 25, 2010 (JP) .................................. 2010-119042

(51) Int. Cl.
*G03B 21/14* (2006.01)
(52) U.S. Cl.
USPC ............... 353/30; 353/94; 353/121; 353/122; 348/745

(58) Field of Classification Search .................... 353/30, 353/31, 69, 94, 121, 122; 348/745, 806
See application file for complete search history.

(56) References Cited

U.S. PATENT DOCUMENTS 6,695,451 B1 2/2004 Yamasaki et al.

FOREIGN PATENT DOCUMENTS

| JP | 2000-206633 A | 7/2000 |
| JP | 3757979 B | 3/2006 |

*Primary Examiner* — William C Dowling
(74) *Attorney, Agent, or Firm* — ALG Intellectual Property, LLC

(57) ABSTRACT

A method for calculating a position adjustment amount of projected image includes a first image step of obtaining first image data which is obtained by an image capturing device imaging first feature points which are displayed using light modulated by a first light modulation device, a second imaging step of obtaining second image data which is obtained by the image capturing device imaging a second feature point which is displayed using light modulated by a second light modulation device, an adjustment amount calculation step of calculating an adjustment amount based on the first image data and the second image data.

8 Claims, 16 Drawing Sheets

POSITION ADJUSTMENT AMOUNT CALCULATION METHOD OF LIGHT MODULATION DEVICE, POSITION ADJUSTMENT AMOUNT CALCULATION DEVICE OF LIGHT MODULATION DEVICE AND PROJECTOR

The entire disclosure of Japanese Patent Application No. 2010-119042, filed May 25, 2010 is expressly incorporated by reference herein.

BACKGROUND

1. Technical Field

The present invention relates to a position adjustment amount calculation method of a light modulation device, a position adjustment amount calculation device of a light modulation device, a projector and the like.

2. Related Art

In recent years, a projector as a projection type image display device has been undergoing improvements in image quality and cost reduction, and there is demand for displaying high definition images in various scenes. For this reason, for example, in a liquid crystal projector having a plurality of liquid crystal panels (light modulation devices) corresponding to different color light beams, it is necessary to adjust installed positions of the liquid crystal panels with high accuracy such that images, which are formed using light beams modulated by the liquid crystal panels corresponding to the respective colors, accurately overlap with each other on a screen (projection plane). Therefore, it is important to precisely measure a position misalignment amount between the liquid crystal panels. Techniques for adjusting positions of such light modulation devices are disclosed in, for example, JP-A-2000-206633 and Japanese Patent No. 3757979.

JP-A-2000-206633 discloses a technique in which a position of one of liquid crystal panels provided for the respective colors is used as a reference, quantitative misalignment amounts of positions of the other liquid crystal panels are calculated, and the positions of the liquid crystal panels are adjusted. Here, in order to quantitate the misalignment amount, a method is used in which a test pattern is imaged by a camera (image capturing device), positions of the test pattern are calculated in the camera coordinates, and a difference between the positions of the test pattern, which are respectively obtained for two liquid crystal panels, is divided by the magnification of the camera.

Also, Japanese Patent No. 3757979 discloses a technique in which, in an image display device which displays images projected by a plurality of projectors by tiling, geometric correction for a superposed area is performed such that the images by the projectors are smoothly connected. At this time, in order to set correction parameters for the geometric correction, a correspondence relationship between positions of two projectors is specified using a camera. In order to measure the correspondence relationship, to begin with, a first correspondence relationship between camera coordinates and projector coordinates in a first projector is generated from a result obtained by the camera imaging three feature points (pixels or the like) which are displayed by the first projector (refer to paragraph 0038 in Japanese Patent No. 3757979). Next, a second correspondence relationship between the camera coordinates and projector coordinates in a second projector is generated from a result obtained by the camera imaging three feature points displayed by the second projector. In addition, a third correspondence relationship between the projector coordinates in the first projector and the projector coordinates in the second projector is generated from the first correspondence relationship and the second correspondence relationship.

However, there is a problem in the techniques disclosed in JP-A-2000-206633 and Japanese Patent No. 3757979 in that a degree of freedom in an installed position of the camera is low. For this reason, if the installed position of the camera is not precisely adjusted, there is a problem in that it is difficult to quantitate the position misalignment amounts of the liquid crystal panels with high accuracy. Hereinafter, this will be described using an example where a position misalignment amount between two liquid crystal panels, a first liquid crystal panel and a second liquid crystal panel is calculated.

FIG. 12A shows an example of a test pattern displayed on a screen using light which is modulated by the first liquid crystal panel. FIG. 12B shows an example of a test pattern displayed on the screen using light which is modulated by the second liquid crystal panel.

In FIG. 12A, the test pattern has four feature points (display pixels) P1 to P4. The feature points P1 to P4 are disposed such that the two points arranged in the transverse direction of a projection image IMG1 including the test pattern and the two points arranged in the longitudinal direction thereof form four corners of a rectangle. In FIG. 12B, the test pattern has one feature point (display pixel) Q1. Here, a pixel corresponding to the feature point P1 positioned at the upper left part among the feature points P1 to P4 in FIG. 12A and a pixel corresponding to the feature point Q1 in FIG. 12B are pixels located at the same positions in the respective liquid crystal panels.

FIG. 13A shows an example where the test pattern in FIG. 12A and the test pattern in FIG. 12B overlap with each other. FIG. 13B schematically shows a captured image obtained by imaging an area where the feature points exist in FIG. 13A using a camera. For example, the projection image IMG3 in FIG. 13A can be formed by a light synthesis means such as a cross-dichroic prism.

Here, the second liquid crystal panel is positioned so as to be misaligned with the first liquid crystal panel by the misalignment amount $\Delta x=d$ of the projection image IMG3 in the transverse direction and the misalignment amount $\Delta y=0$ of the projection image IMG3 in the longitudinal direction, for the feature point P1 and the feature point Q1. Therefore, when an area AR0 surrounded by dotted lines in FIG. 13A is imaged by the camera, the captured image shown in FIG. 13B can be obtained. Thereby, since the misalignment amounts $\Delta x$ and $\Delta y$ are correctly calculated by the method disclosed in JP-A-2000-206633, it is possible to correctly adjust the position of either the first liquid crystal panel or the second liquid crystal panel according to the misalignment amounts $\Delta x$ and $\Delta y$.

However, in the technique disclosed in JP-A-2000-206633, it is necessary to correctly install the camera imaging the area AR0 in FIG. 13A at a front-on position with respect to the screen. For example, if the camera is installed to be tilted, the misalignment amount may not be correctly calculated. In addition, in a case where an image passing through a projection lens constituting the projector is distorted, or the camera is installed to be shifted and tilted with respect to the screen as well, the misalignment amount may not be correctly calculated.

FIG. 14 schematically shows an example of a captured image obtained by imaging the area AR0 in FIG. 13A after the camera is fixed in a tilted state.

FIG. 15A schematically shows the distortion of an image projected by the projector. FIG. 15B schematically shows a captured image obtained by imaging the area AR0 in FIG.

15A using the camera. In FIGS. 15A and 15B, the parts corresponding to those in FIG. 13A have the same reference numerals.

FIG. 16 schematically shows a captured image obtained by imaging the area AR0 using the camera which is installed to be shifted and tilted with respect to the screen. In FIG. 16, the parts corresponding to those in FIG. 13A have the same reference numerals.

If an image is captured in the state where the camera is tilted, a captured image which is rotated relative to FIG. 13B can be obtained. For example, in the case of FIG. 14, the rectangle having the four corners of the feature points P1 to P4 is rotated relative to FIG. 13B. Therefore, it is necessary to calculate a misalignment amount between the feature point P1 and the feature point Q1 in consideration of the installed state of the camera, and there are cases where non-negligible errors occur in the calculated misalignment amount.

In the liquid crystal projector, images on the liquid crystal panels are displayed on the screen after passing through a projection lens. The images after passing through the projection lens are distorted, and an image actually displayed on the screen is similar to that shown in FIG. 15A. For this reason, in a captured image of the area AR0 in FIG. 15A, the rectangle having the feature points P1 to P4 as the four corners becomes the parallelogram as shown in FIG. 15B. In the method disclosed in JP-A-2000-206633, if the misalignment amount is calculated based on the captured image as shown in FIG. 14 or 15B, although the liquid crystal panel is actually misaligned only in the transverse direction, there are cases where the misalignment of the liquid crystal panel is considered to occur in the tilted direction as well. In this case, there is a problem in that the misalignment amount may not be correctly calculated.

At this time, a measurement error caused by the installation of the camera or a measurement error caused by the distortion of the projection lens may be solved to a degree through the measurement using the method disclosed in Japanese Patent No. 3757979. However, in the case where the camera is installed to be shifted and tilted with respect to the screen, in the captured image of the area AR0, the rectangle having the feature points P1 to P4 as the four corners does not even become the parallelogram. Thereby, there are problems in that it is difficult to correctly calculate a misalignment amount even using the method disclosed in Japanese Patent No. 3757979, and to correctly adjust positions of the liquid crystal panels.

SUMMARY

An advantage of some aspects of the invention is to provide a position adjustment method of a light modulation device capable of adjusting the position of the light modulation device with a high accuracy irrespective of an installation status of an image capturing device or distortion of an image, a position adjustment amount calculation device of a light modulation device, a projector and the like.

According to an aspect of the invention, there is provided a method for calculating a position adjustment amount of projected image including displaying a first test pattern including at least four first feature points on a projection plane using light modulated by a first light modulation device; obtaining first image data by imaging the first feature points displayed in the displaying of the first test pattern using an image capturing device; displaying a second test pattern including at least one second feature point on the projection plane using light modulated by a second light modulation device; obtaining second image data by imaging the second feature point displayed in the displaying of the second test pattern using the image capturing device; calculating correspondence relationships between positions corresponding to the first feature points in a first coordinate system defined in the first light modulation device and positions corresponding to the first feature points in an image-capturing coordinate system defined in the image capturing device, based on the first image data; calculating an adjustment amount according to a misalignment amount between a position corresponding to the second feature point in the first coordinate system and a position corresponding to the second feature point in a second coordinate system defined in the second light modulation device, based on the correspondence relationships and the second image data.

According to the aspect of the invention, the correspondence relationship between the first coordinate system and the image-capturing coordinate system is obtained for at least four first feature points, and a position of at least one second feature point is converted into the first coordinate system according to the correspondence relationship. In addition, a position of at least one of the first light modulation device and the second light modulation device is adjusted according to a difference between the position corresponding to the second feature point in the first coordinate system and the original position corresponding to the second feature point in the second coordinate system. Thereby, even in a case where the image capturing device is installed to be tilted or an image is distorted, or the like, it is possible to correctly calculate a misalignment amount. In this way, since the degree of freedom in the installation of the image capturing device is heightened, for example, it is possible to capture an image at a position close to a test pattern from the outside of the projection plane, and, it is possible to further improve a calculation accuracy of the misalignment amount due to the image capturing at high magnification.

In the position adjustment method, a position corresponding to the second feature point in the first coordinate system may be calculated based on the correspondence relationship between the image-capturing coordinate system and the first coordinate system, and the second image data. In addition, there may be a calculation of a misalignment amount between the position corresponding to the second feature point in the second coordinate system and the position corresponding to the second feature point in the first coordinate system. Thereby, it is possible to adjust a position of the light modulation device with high accuracy by a very simple process, in addition to the above effect.

According to the aspect of the invention, in addition to the above effects, it is possible to correctly adjust a position of the light modulation device with high accuracy even if the image-capturing device is installed to be shifted and tilted with respect to the projection plane.

Further, according to the aspect of the invention, in addition to the above effects, it is possible to adjust a position of the light modulation device with higher accuracy.

In the position adjustment method, the adjustment amounts may be respectively obtained for a plurality of areas provided in an image displayed on the projection plane, and a position of the light modulation device may be adjusted based on the plurality of adjustment amounts. Thereby, it is possible to adjust a position of the light modulation device with higher accuracy as compared with the case of performing the adjustment based on an adjustment amount obtained for a single area.

According to another aspect of the invention, there is provided a position adjustment amount calculation device of a light modulation device including a first image data obtaining unit that obtains first image data which is obtained by an image capturing device imaging at least four first feature points which are displayed on a projection plane using light modulated by a first light modulation device; a second image data obtaining unit that obtains second image data which is obtained by the image capturing device imaging at least one second feature point which is displayed on the projection plane using light modulated by a second light modulation device; a correspondence relationship calculation unit that calculates correspondence relationships between positions corresponding to the first feature points in a first coordinate system defined in the first light modulation device and positions corresponding to the first feature points in an image-capturing coordinate system defined in the image capturing device, based on the first image data; and an adjustment amount calculation unit that calculates an adjustment amount according to a misalignment amount between a position corresponding to the second feature point in the first coordinate system and a position corresponding to the second feature point in a second coordinate system defined in the second light modulation device, based on the correspondence relationships and the second image data.

According to this aspect of the invention, the correspondence relationship between the first coordinate system and the image-capturing coordinate system is obtained for at least four first feature points, and a position of at least one second feature point is converted into the first coordinate system according to the correspondence relationship. In addition, a position of at least one of the first light modulation device and the second light modulation device is adjusted according to a difference between the position corresponding to the second feature point in the first coordinate system and the original position corresponding to the second feature point in the second coordinate system. Thereby, even in a case where the image capturing device is installed to be tilted or an image is distorted, or the like, it is possible to correctly calculate a misalignment amount. In this way, since the degree of freedom in the installation of the image capturing device is heightened, for example, it is possible to capture an image at a position close to a test pattern from the outside of the projection plane, and, it is possible to further improve a calculation accuracy of the misalignment amount due to the image capturing at high magnification.

According to still another aspect of the invention, there is provided a projector including a first light modulation device; a second light modulation device; a first image data obtaining unit that obtains first image data which is obtained by an image capturing device imaging at least four first feature points which are displayed on a projection plane using light modulated by the first light modulation device; a second image data obtaining unit that obtains second image data which is obtained by the image capturing device imaging at least one second feature point which is displayed on the projection plane using light modulated by the second light modulation device; a correspondence relationship calculation unit that calculates correspondence relationships between positions corresponding to the first feature points in a first coordinate system defined in the first light modulation device and positions corresponding to the first feature points in an image-capturing coordinate system defined in the image capturing device, based on the first image data; an adjustment amount calculation unit that calculates an adjustment amount according to a misalignment amount between a position corresponding to the second feature point in the first coordinate system and a position corresponding to the second feature point in a second coordinate system defined in the second light modulation device, based on the correspondence relationships and the second image data; and a position adjustment mechanism portion that adjusts a position of at least one of the first light modulation device and the second light modulation device based on the adjustment amount calculated by the adjustment amount calculation unit.

According to this aspect of the invention, it is possible to provide a projector capable of adjusting a position of the light modulation device with high accuracy regardless of an installed state of the image capturing device or distortion of an image.

According to this aspect of the invention, it is possible to improve a degree of freedom in an installed position of the image capturing device, and, in addition to the above effects, it is possible to contribute to miniaturizing the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings. The embodiments described below do not unduly limit the content of the invention set forth in the claims. In addition, all the configurations described below are not necessarily essential configuration requirements of the invention for solving the problems.

Hereinafter, although an example where positions of light modulation devices are adjusted such that images formed using light modulated by two light modulation devices completely overlap with each other will be described, the invention is not limited thereto.

Figure 1:
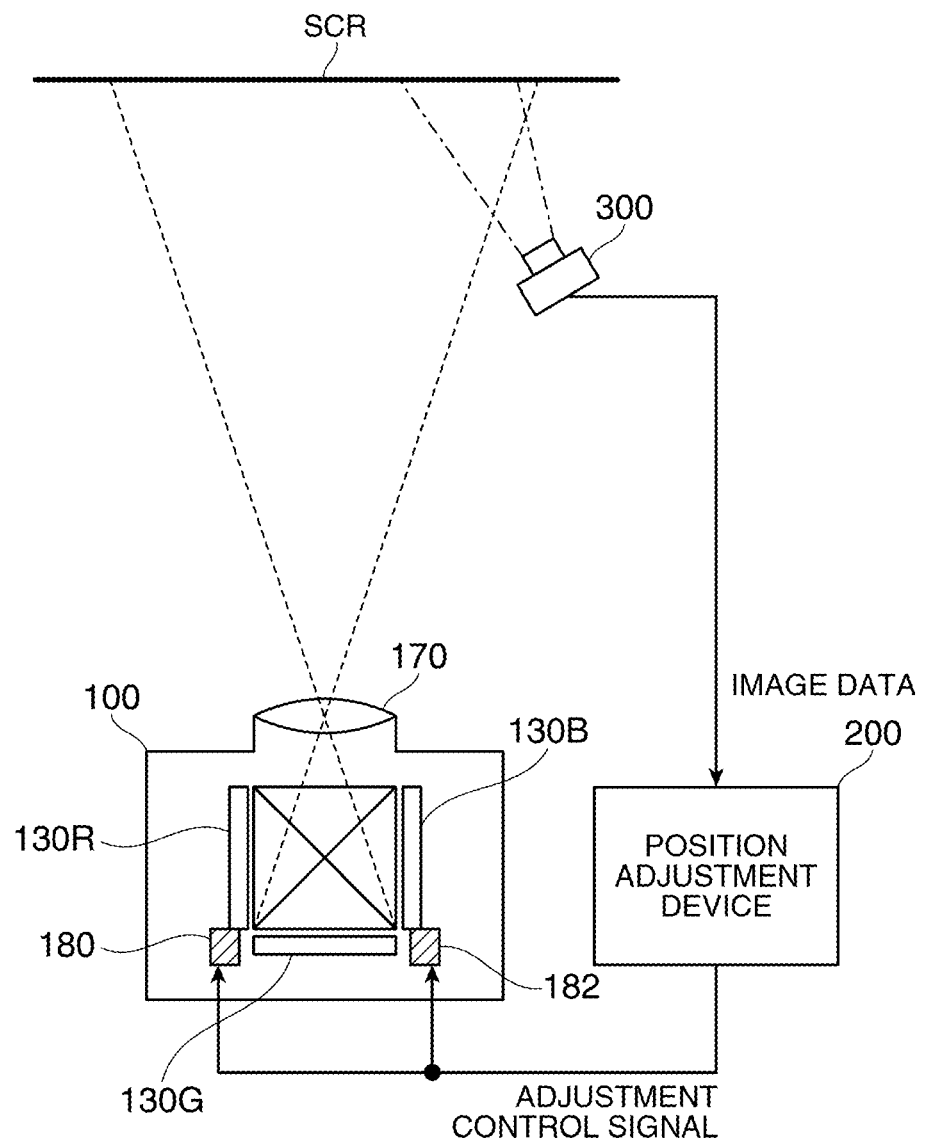
FIG. 1 is a block diagram illustrating a configuration example of a display system according to an embodiment of the invention.

FIG. 1 shows a block diagram of a configuration example of a display system according to an embodiment of the invention. FIG. 1 is a schematic diagram when a screen which is a projection plane is seen from the top side.

Figure 2:
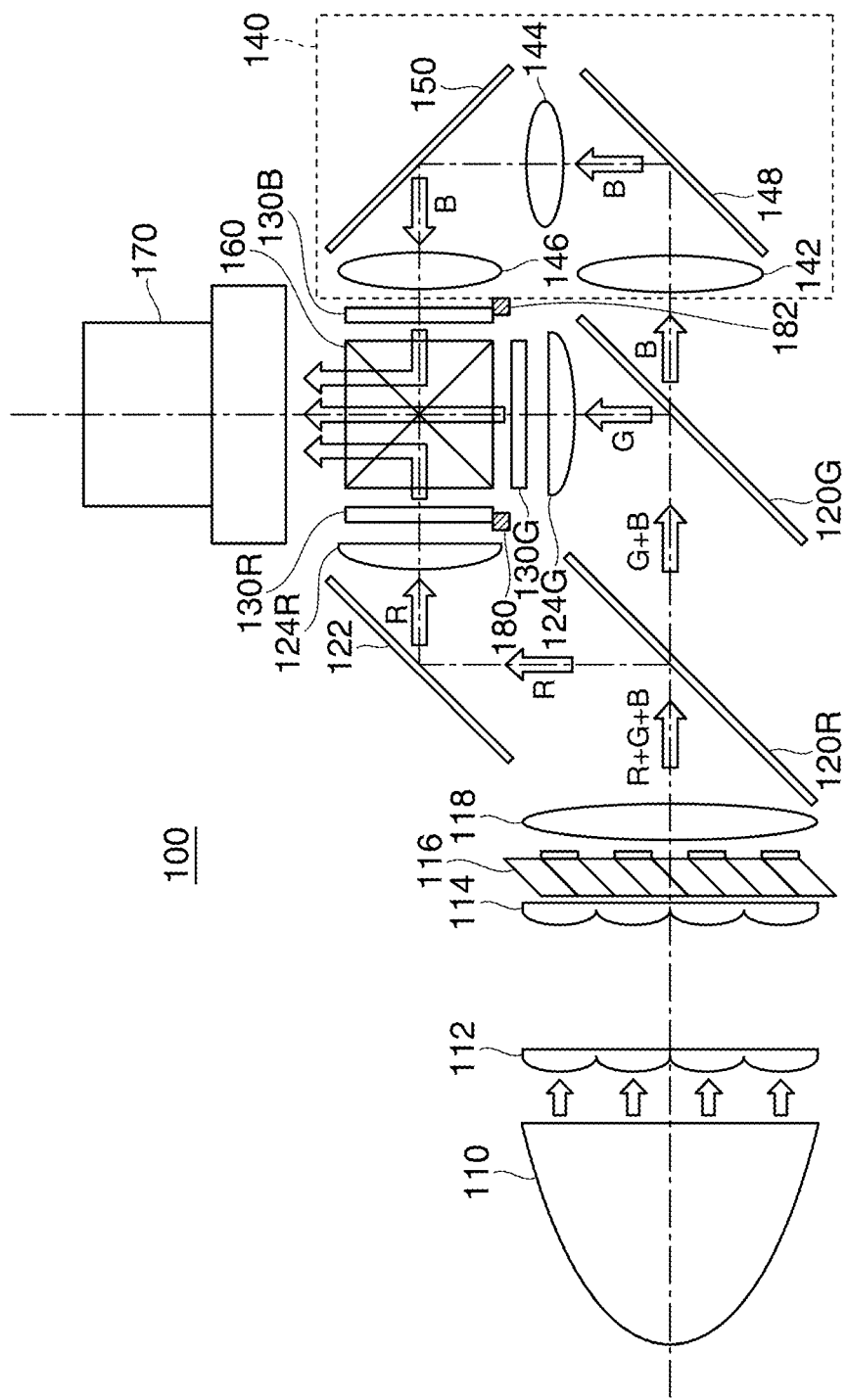
FIG. 2 is a diagram illustrating an outline of a configuration of the projector in FIG. 1.

FIG. 2 shows an outline of a configuration of a projector 100 in FIG. 1. FIG. 2 is a diagram illustrating a three-plate type liquid crystal projector which uses liquid crystal panels as the light modulation devices. In FIG. 2, the parts corresponding to those in FIG. 1 have the same reference numerals, and the description thereof will be appropriately omitted.

A display system 10 includes the projector 100, a position adjustment device 200, and a camera (image capturing device) 300. The projector 100 projects an image corresponding to image data which is generated by an image data generation device (not shown) onto a screen SCR. The camera 300 captures an image of a test pattern, which is projected on the screen SCR (projection plane) by the projector 100. The position adjustment device 200 performs a control for adjusting positions of the liquid crystal panels which modulate light beams from a light source based on image data generated for respective colors. At this time, the position adjustment device 200 performs a control for adjusting a position of the liquid crystal panel to be adjusted based on a captured image of a test pattern formed by the liquid crystal panel which is used as a reference, and a captured image of a test pattern formed by the liquid crystal panel to be adjusted. In addition, in FIG. 1, although the position adjustment device 200 is installed outside the projector 100, the projector 100 may embed at least one of the position adjustment device 200 and the camera 300 therein.

The projector 100, as shown in FIG. 2, includes a light source 110, a pair of integrator lenses 112 and 114, a polarization conversion element 116, a superposing lens 118, an R dichroic mirror 120R, a G dichroic mirror 120G, and a reflection mirror 122. Further, the projector 100 includes an R field lens 124R, a G field lens 124G, an R liquid crystal panel 130R (second light modulation device), a G liquid crystal panel 130G (first light modulation device), and a B liquid crystal panel 130B. Further, the projector 100 includes a relay optical system 140, a cross-dichroic prism 160, a projection lens 170, and position adjustment mechanism portions 180 and 182. Liquid crystal panels used as the R liquid crystal panel 130R, the G liquid crystal panel 130G, and the B liquid crystal panel 130B are transmissive liquid crystal displays. The relay optical system 140 includes relay lenses 142, 144, 146, and reflection mirrors 148 and 150.

The light source 110 is constituted by, for example, an extra high pressure mercury lamp, and emits light including at least R component light, G component light, and B component light. The integrator lens 112 has a plurality of small lenses for splitting a light beam from the light source 110 into a plurality of partial light beams. The integrator lens 114 has a plurality of small lenses corresponding to the plurality of small lenses of the integrator lens 112. The superposing lens 118 superposes the partial light beams from the plurality of small lenses of the integrator lens 112 on the liquid crystal panels.

The polarization conversion element 116 has a polarization beam split array and a $\lambda/2$ plate, and converts the light from the light source 110 into substantially one kind of polarized light. The polarization beam split array has a structure in which a polarized light separation film, which separates the partial light beams split by the integrator lens 112 into a p polarized light beam and an s polarized light beam, and a reflection film, which changes directions of the light beams reflected by the polarized light separation film, are alternately arranged. The two kinds of polarized light beams separated by the polarized light separation film can have a uniform polarization direction by the $\lambda/2$ plate. The light beams which are converted into substantially one kind of polarized light by the polarization conversion element 116 enter the superposing lens 118.

The light beams from the superposing lens 118 are incident to the R dichroic mirror 120R. The R dichroic mirror 120R reflects the R component light beam, and transmits the G component light beam and the B component light beam therethrough. The light beams transmitted through the R dichroic mirror 120R reach the G dichroic mirror 120G, and the light beam reflected by the R dichroic mirror 120R is reflected by the reflection mirror 122 and then is guided to the R field lens 124R. The G dichroic mirror 120G reflects the G component light beam and transmits the B component light beam therethrough. The light beam transmitted through the G dichroic mirror 120G is incident to the relay optical system 140, and the light beam reflected by the G dichroic mirror 120G is guided to the G field lens 124G.

In the relay optical system 140, in order to reduce a difference between the optical path length of the B component light beam which has been transmitted through the G dichroic mirror 120G and the optical path lengths of the other R and G component light beams as much as possible, the difference between the optical path lengths is corrected using the relay lenses 142, 144 and 146. The light transmitted through the relay lens 142 is guided to the relay lens 144 by the reflection mirror 148. The light transmitted through the relay lens 144 is guided to the relay lens 146 by the reflection mirror 150. The light transmitted through the relay lens 146 is incident to the B liquid crystal panel 130B.

The light incident to the R field lens 124R is converted into parallel light and then is incident to the R liquid crystal panel 130R. The R liquid crystal panel 130R functions as a light modulation device, and changes transmittance (passage rate or modulation rate) based on R image data. Therefore, the light incident to the R liquid crystal panel 130R is modulated based on the R image data, and the modulated light is incident to the cross-dichroic prism 160. The light incident to the G field lens 124G is converted into parallel light, and then is incident to the G liquid crystal panel 130G. The G liquid crystal panel 130G functions as a light modulation device, and changes transmittance based on G image data. Therefore, the light incident to the G liquid crystal panel 130G is modulated based on the G image data, and the modulated light is incident to the cross-dichroic prism 160. The B liquid crystal panel 130B to which the light converted into parallel light by the relay lenses 142, 144 and 146 is incident functions as a light modulation device, and changes transmittance based on B image data. Therefore, the light incident to the B liquid crystal panel 130B is modulated based on the B image data, and the modulated light is incident to the cross-dichroic prism 160.

The R liquid crystal panel 130R, the G liquid crystal panel 130G, and the B liquid crystal panel 130B have the same configuration. Each liquid crystal panel is a panel in which liquid crystal which is an electro-optic material is sealed between a pair of transparent glass substrates, and, modulates the passage rate of each color light beam according to the image data for each color by using, for example, poly-silicon thin film transistors as switching elements.

The cross-dichroic prism 160 outputs synthesized light obtained by synthesizing the light beams emitted from the R liquid crystal panel 130R, the G liquid crystal panel 130G, and the B liquid crystal panel 130B, as emission light. The projection lens 170 enlarges the output image on the screen SCR and forms an image thereon.

In this embodiment, by using a position of the G liquid crystal panel 130G as a reference, a position of the R liquid crystal panel 130R or the B liquid crystal panel 130B is adjusted. For this reason, the position adjustment mechanism portion 180 adjusts the position of the R liquid crystal panel 130R in response to an adjustment control signal from the position adjustment device 200. In addition, the position adjustment mechanism portion 182 adjusts the position of the B liquid crystal panel 130B in response to an adjustment control signal from the position adjustment device 200. The position adjustment mechanism portions 180 and 182 respectively include optical stages with actuators, and the corresponding liquid crystal panel is fixed to and installed in the optical stage. In this case, each optical stage can be moved in the transverse direction and in the longitudinal direction on the plane perpendicular to each optical axis, and thus it is possible to adjust the positions of the liquid crystal panels according to the adjustment control signals corresponding to the movement amount.

Figure 3:
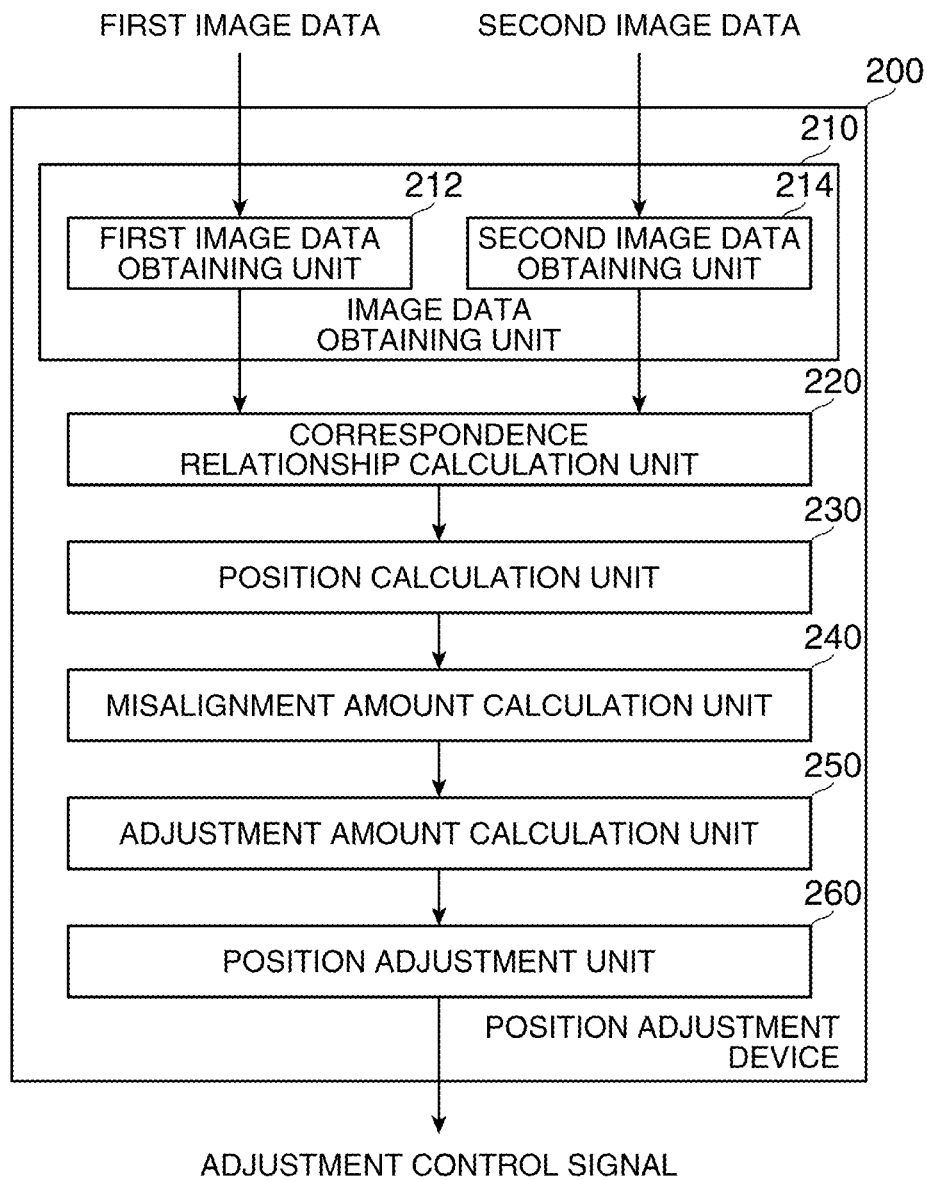
FIG. 3 is a functional block diagram of a configuration example of the position adjustment device in FIG. 1.

FIG. 3 shows a functional block diagram of a configuration example of the position adjustment device 200 in FIG. 1.

Figure 4A:
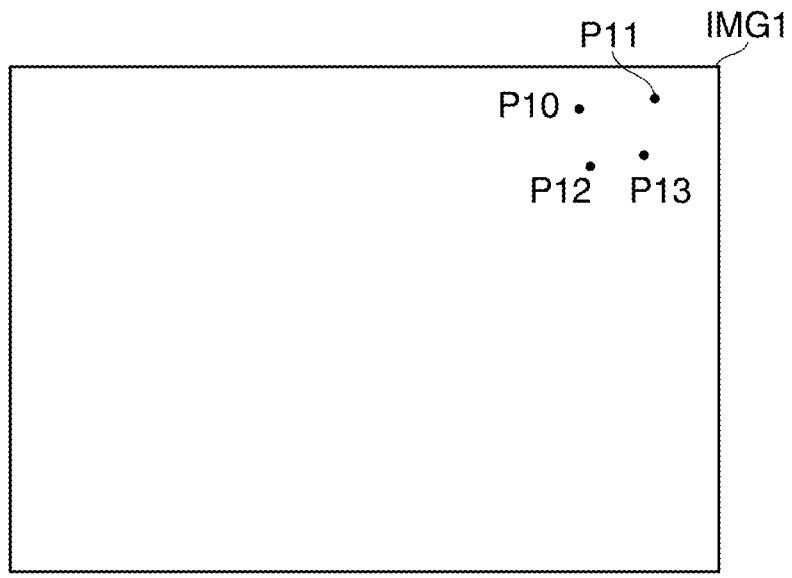
FIGS. 4A and 4B are diagrams illustrating examples of test patterns according to this embodiment.
Figure 4B:
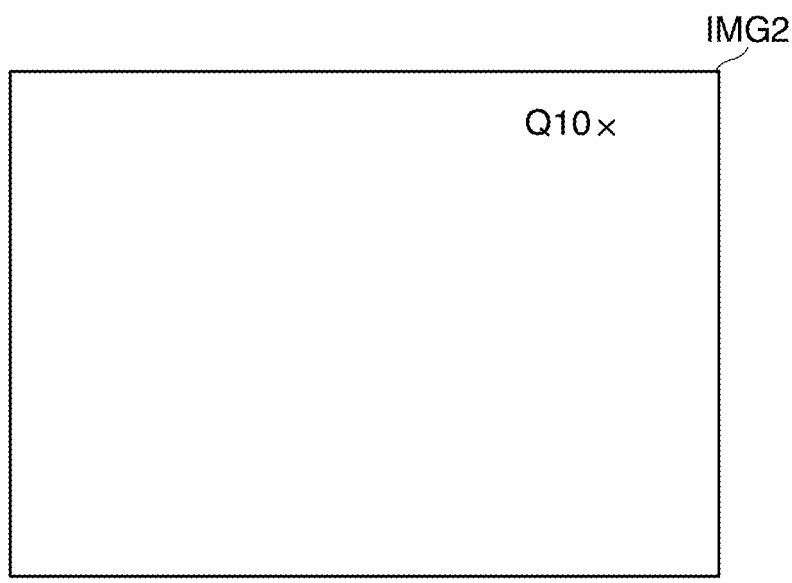

FIGS. 4A and 4B show examples of test patterns according to this embodiment. FIG. 4A schematically shows an example of a first test pattern which is formed using light modulated by the G liquid crystal panel 130G which is used as an adjustment reference. FIG. 4B schematically shows an example of a second test pattern which is formed by light modulated by the liquid crystal panel to be adjusted.

Figure 5A:
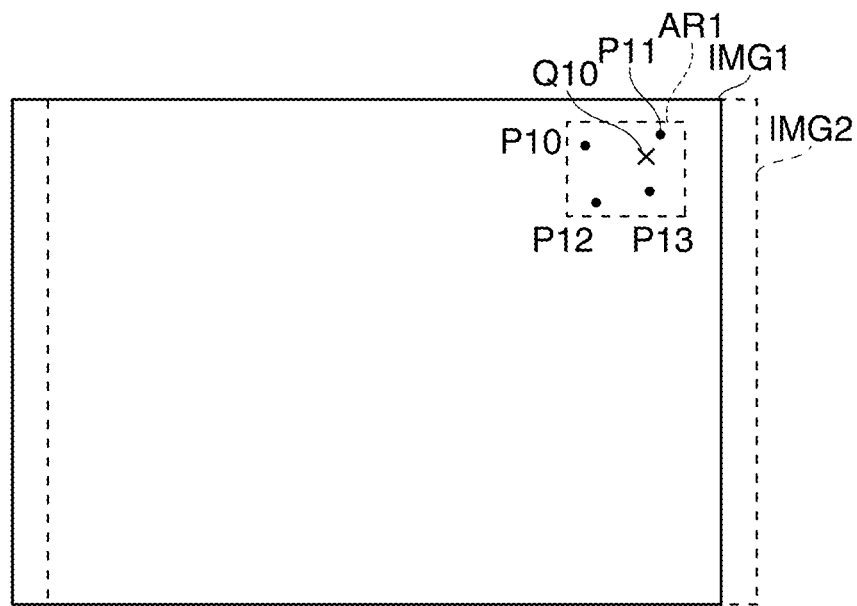
FIGS. 5A and 5B are diagrams illustrating examples where the first test pattern in FIG. 4A and the second test pattern in FIG. 4B overlap with each other.
Figure 5B:
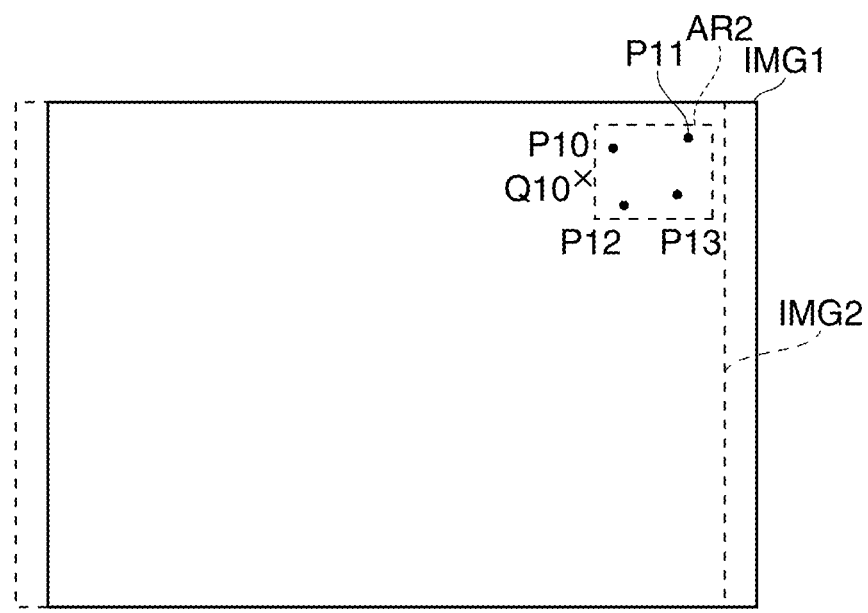

FIGS. 5A and 5B show an example where the first test pattern in FIG. 4A and the second test pattern in FIG. 4B overlap with each other.

The position adjustment device 200 includes a image data obtaining unit 210, a correspondence relationship calculation unit 220, a position calculation unit 230, a misalignment amount calculation unit 240, an adjustment amount calculation unit 250, and a position adjustment unit 260. The image data obtaining unit 210 includes a first image data obtaining unit 212, and a second image data obtaining unit 214.

The first image data obtaining unit 212 obtains first image data obtained by the camera 300 capturing an image IMG1 of the first test pattern shown in FIG. 4A on the screen SCR. The image IMG1 is formed using light modulated by the G liquid crystal panel 130G used as a reference. The first test pattern, as shown in FIG. 4A, includes at least four feature points (display pixels, and first feature points) P10 to P13 in the image IMG1. The first test pattern preferably includes the feature points P10 to P13 arranged such that no combination of three points exists in a straight line on the screen SCR. The positions of the feature points P10 to P13 are recognized in advance in the panel coordinate system defined in the light modulation plane for the G liquid crystal panel 130G. In addition, the position of each of the feature points P10 to P13 is not limited to being specified to one pixel as shown in FIG. 4A, but may be specified by a central position of several pixels, or may be specified by an intersected position of a cross-shape or an X-shape, that is, the position thereof is not limited to the shape formed by the feature points.

The second image data obtaining unit 214 obtains second image data obtained by the camera 300 capturing an image IMG2 of the second test pattern shown in FIG. 4B on the screen SCR. The image IMG2 is formed using light modulated by the liquid crystal panel to be adjusted (for example, the R liquid crystal panel 130R or the B liquid crystal panel 130B). The second test pattern, as shown in FIG. 4B, includes at least one feature point (display pixel, and a second feature point) Q10 in the image IMG2. For example, the position of the feature point Q10 is recognized in advance in the panel coordinate system defined in the R liquid crystal panel 130R or the B liquid crystal panel 130B. The feature point Q10 is displayed as shown in FIG. 5A so as to be disposed in an area AR1 which is formed by connecting the feature points P10 to P13 on the screen SCR. Alternatively, the feature point Q10 is displayed as shown in FIG. 5B so as to be disposed outside an area AR2 which is formed by connecting the feature points P10 to P13 on the screen SCR and around the area AR2. In this way, it is possible to adjust positions of the liquid crystal panels with higher accuracy.

The correspondence relationship calculation unit 220 calculates correspondence relationships between positions corresponding to the feature points P10 to P13 in the first panel coordinate system (first coordinate system) and positions corresponding to the feature points P10 to P13 in the camera coordinates, based on the first image data obtained by the first image data obtaining unit 212. The first panel coordinate system is defined in the G liquid crystal panel 130G.

The position calculation unit 230 calculates a position corresponding to the feature point Q10 in the first panel coordinate system based on the correspondence relationship calculated by the correspondence relationship calculation unit 220 and the second image data obtained by the second image data obtaining unit 214. In other words, the position calculation unit 230 calculates the position corresponding to the feature point Q10 in the first panel coordinate system from the position corresponding to the feature point Q10 in the camera coordinate system and the correspondence relationship between the first panel coordinate system and the camera coordinate system.

The misalignment amount calculation unit 240 calculates a misalignment amount between a position corresponding to the feature point Q10 in the second panel coordinate system (second coordinate system) and the position corresponding to the feature point Q10 in the first panel coordinate system calculated by the position calculation unit 230. The second panel coordinate system is defined in the R liquid crystal panel 130R or the B liquid crystal panel 130B.

The adjustment amount calculation unit 250 calculates an adjustment amount corresponding to the misalignment amount calculated by the misalignment amount calculation unit 240. The position adjustment unit 260 performs a control for adjusting a position of the R liquid crystal panel 130R or the B liquid crystal panel 130B based on the adjustment amount calculated by the adjustment amount calculation unit 250.

In this embodiment, although the example where a position of the R liquid crystal panel 130R or the B liquid crystal panel 130B is adjusted by using a position of the G liquid crystal panel 130G as a reference is described, the invention is not limited thereto. For example, the position adjustment unit 260 may perform a control for adjusting at least one position of the G liquid crystal panel 130G, the R liquid crystal panel 130R, and the B liquid crystal panel 130B. Hereinafter, although a process example of adjusting a position of the R liquid crystal panel 130R by using a position of the G liquid crystal panel 130G as a reference will be described, this is also the same for a process of adjusting a position of the B liquid crystal panel 130B by using a position of the G liquid crystal panel 130G as a reference.

Figure 6:
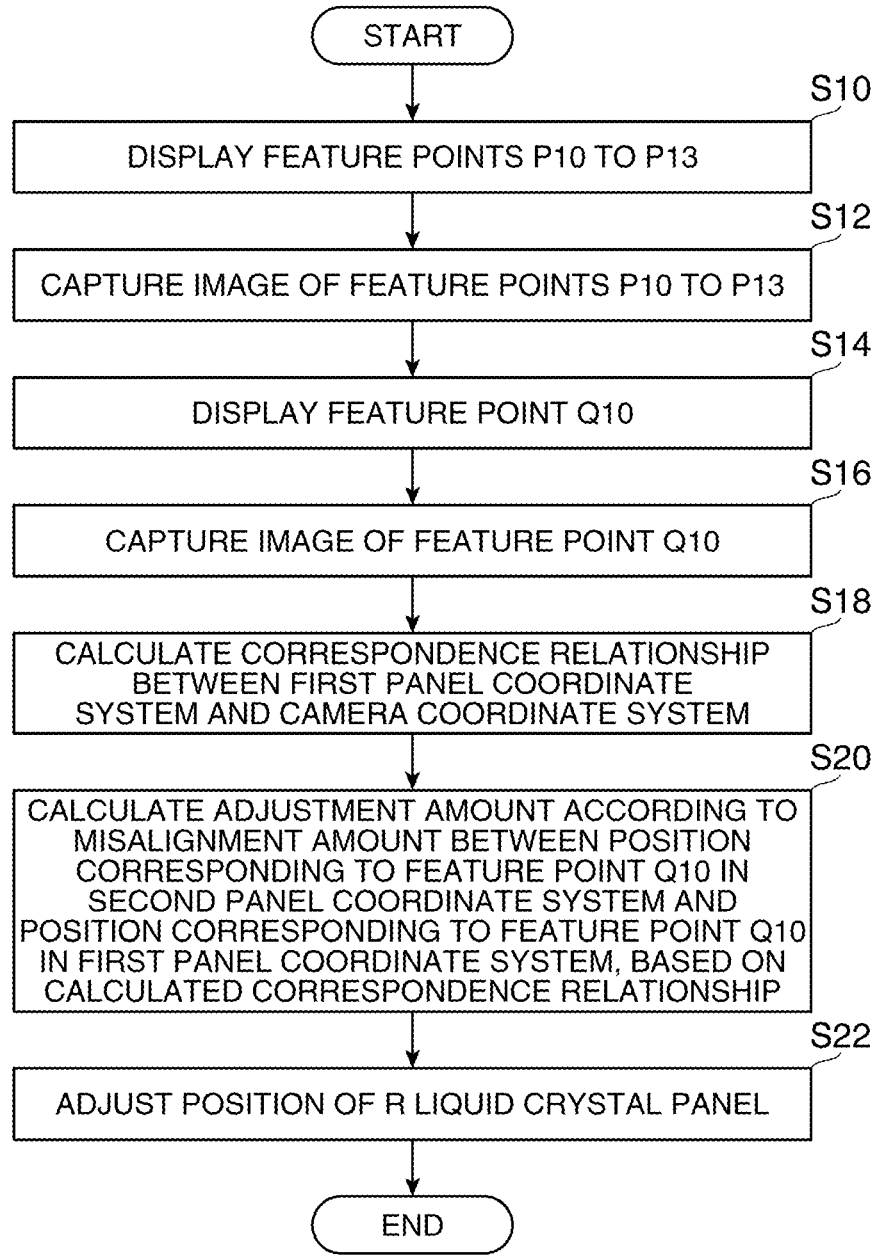
FIG. 6 is a diagram illustrating a process example of a position adjustment method of the liquid crystal panel according to this embodiment.

FIG. 6 shows a process example of a position adjustment method of the liquid crystal panel according to this embodiment.

First, for example, under the control of the position adjustment device 200, the projector 100 displays the first test pattern having the feature points P10 to P13 shown in FIG. 4A on the screen SCR (step S10, and a first display step). In step S10, the first test pattern having the feature points P10 to P13 is displayed using light modulated by the G liquid crystal panel 130G. Next, for example, under the control of the position adjustment device 200, the camera 300 captures an image of the feature points P10 to P13 displayed on the screen SCR (step S12, and a first imaging step). The position adjustment device 200 receives image data obtained by the camera 300 as the first image data.

Next, for example, under the control of the position adjustment device 200, the projector 100 displays the second test pattern having the feature point Q10 shown in FIG. 4B on the screen SCR (step S14, and a second display step). In step S14, the second test pattern having the feature point Q10 is displayed using light modulated by the R liquid crystal panel 130R. When the first test pattern and the second test pattern are displayed to overlap with each other, as shown in FIGS. 5A and 5B, the second test pattern is displayed such that the feature point Q10 is disposed in an area, or around the area, formed by connecting the feature points P10 to P13. Then, for example, under the control of the position adjustment device 200, the camera 300 captures an image of the feature point Q10 displayed on the screen SCR (step S16, and a second imaging step). The position adjustment device 200 receives image data obtained by the camera 300 as the second image data. In addition, an installed position of the camera 300 is fixed, and the position of the camera 300 during the capturing an image in step S12 and the position of the camera 300 during the capturing an image in step S16 are the same as each other.

The position adjustment device 200 calculates a correspondence relationship between the first panel coordinate system in the G liquid crystal panel 130G and the camera coordinate system in the camera 300 based on the first image data obtained in step S12 (step S18, and a correspondence relationship calculation step). Thereafter, the position adjustment device 200 calculates an adjustment amount corresponding to the misalignment amount between the position corresponding to the feature point Q10 in the second panel coordinate system in the R liquid crystal panel 130R and the position corresponding to the feature point Q10 in the first panel coordinate system (step S20, and an adjustment amount calculation step). In step S20, the calculated correspondence relationship between the first panel coordinate system and the camera coordinate system, and the second image data, are used.

Next, the position adjustment device 200 adjusts a position of the R liquid crystal panel 130R according to the adjustment amount calculated in step S20 (step S22, and a position adjustment step) and finishes the series of processes (END).

Next, a position adjustment process performed by the position adjustment device 200 will be described in detail.

Figure 7:
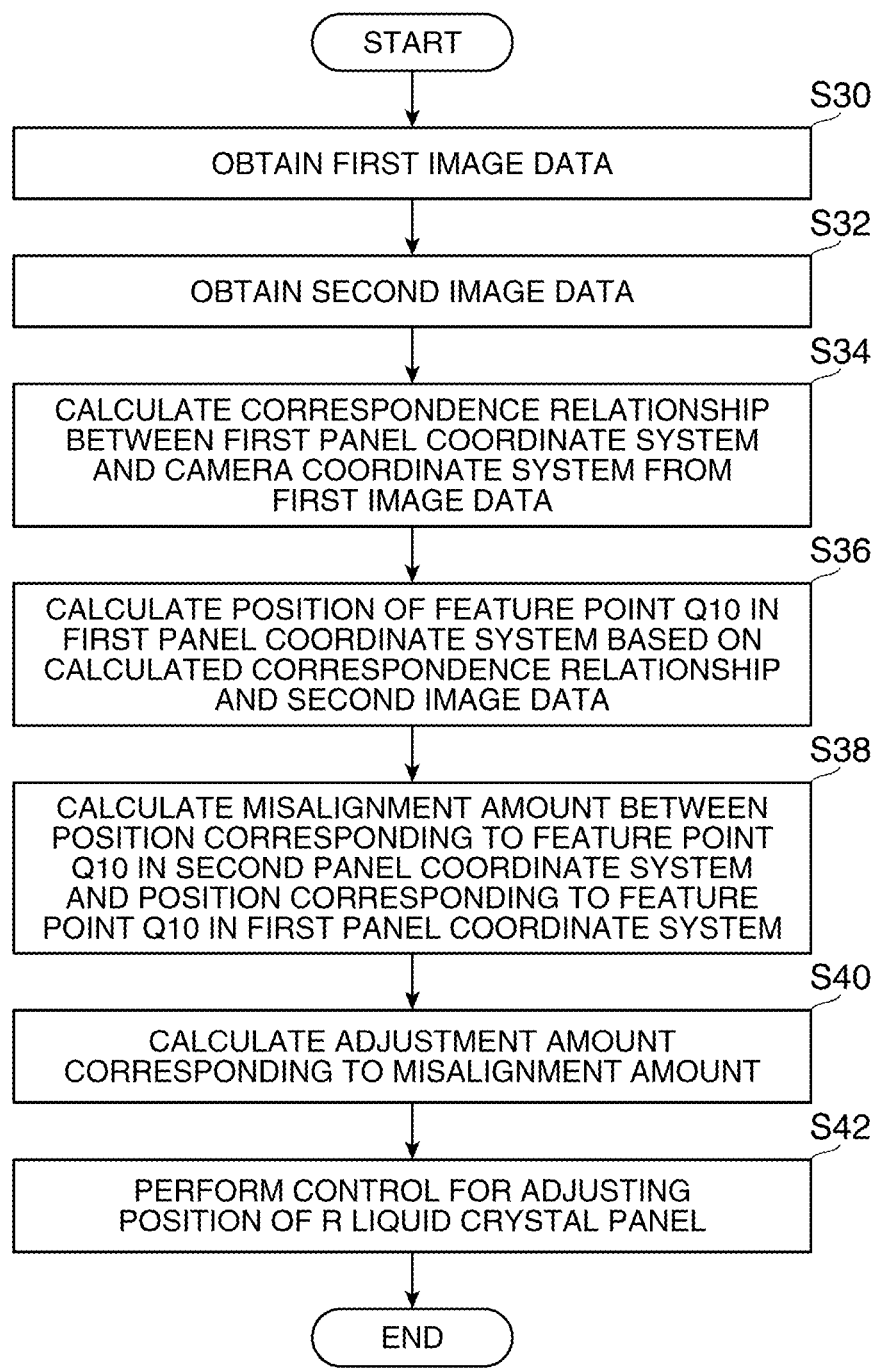
FIG. 7 is a flowchart of a process example in the position adjustment device.

FIG. 7 shows a flowchart of a process example in the position adjustment device 200. The position adjustment device 200 is constituted by an ASIC (Application Specific Integrated Circuit) or dedicated hardware, and enables hardware corresponding to each of the units in FIG. 3 to execute the process in each step shown in FIG. 7. Alternatively, the position adjustment device 200 may be constituted by a central processing unit (CPU), a read only memory (ROM), or a random access memory (RAM). In this case, the position adjustment device 200 executes the process in each step shown in FIG. 7 by the CPU, which reads a program stored in the ROM or the RAM, executing a process according to the program.

The position adjustment device 200 obtains the first image data which is image data for the image in FIG. 4A and which is obtained in step S12 using the first image data obtaining unit 212 (step S30, and a first image data obtaining step). Thereafter, the position adjustment device 200 obtains the second image data which is image data for the image in FIG. 4B and which is obtained in step S16 using the second image data obtaining unit 214 (step S32, and a second image data obtaining step). Next, the position adjustment device 200 calculates a correspondence relationship between the first panel coordinate system and the camera coordinate system from the first image data obtained in step S30, using the correspondence relationship calculation unit 220 (step S34, and a correspondence relationship calculation step).

Here, it is assumed that, in the first panel coordinate system, the position of the feature point P10 is designated as (X1P1, Y1P1), the position of the feature point P11 is designated as (X2P1, Y2P1), the position of the feature point P12 is designated as (X3P1, Y3P1), and the position of the feature point P13 is designated as (X4P1, Y4P1). The correspondence relationship calculation unit 220 calculates positions corresponding to the feature points P10 to P13 in the camera coordinate system from the first image data. At this time, the positions of the feature points P10 to P13 in the camera coordinate system are calculated through calculation of a center, detection of luminance peak, or the like, based on the first image data. As a result, a position (X1CAM, Y1CAM) corresponding to the feature point P10, a position (X2CAM, Y2CAM) corresponding to the feature point P11, a position (X3CAM, Y3CAM) corresponding to the feature point P12, and a position (X4CAM, Y4CAM) corresponding to the feature point P13 are obtained in the camera coordinate system. Thereby, the positions (X1P1, Y1P1) to (X4P1, Y4P1) in the first panel coordinate system respectively correspond to the positions (X1CAM, Y1CAM) to (X4CAM, Y4CAM) in the camera coordinate system.

In this embodiment, coordinate conversion equations for converting the position (XCAM, YCAM) in the camera coordinate system into the position (XP1, YP1) in the first panel coordinate system are given by the following Equations 1 and 2. The correspondence relationship calculation unit 220 calculates coordinate conversion equations specified by parameters a to h as the correspondence relationships by calculating the parameters a to h in the equations.

$$X_{P1} = \frac{(a \times X_{CAM} + b \times Y_{CAM} + c)}{(g \times X_{CAM} + h \times Y_{CAM} + 1)} \quad (1)$$

$$Y_{P1} = \frac{(d \times X_{CAM} + e \times Y_{CAM} + f)}{(g \times X_{CAM} + h \times Y_{CAM} + 1)} \quad (2)$$

The parameters a to h can be calculated from the following Equations 3 to 10 obtained by assigning the feature points P10 to P13, respectively.

$$X1_{P1} = \frac{(a \times X1_{CAM} + b \times Y1_{CAM} + c)}{(g \times X1_{CAM} + h \times Y1_{CAM} + 1)} \quad (3)$$

$$Y1_{P1} = \frac{(d \times X1_{CAM} + e \times Y1_{CAM} + f)}{(g \times X1_{CAM} + h \times Y1_{CAM} + 1)} \quad (4)$$

$$X2_{P1} = \frac{(a \times X2_{CAM} + b \times Y2_{CAM} + c)}{(g \times X2_{CAM} + h \times Y2_{CAM} + 1)} \quad (5)$$

$$Y2_{P1} = \frac{(d \times X2_{CAM} + e \times Y2_{CAM} + f)}{(g \times X2_{CAM} + h \times Y2_{CAM} + 1)} \quad (6)$$

$$X3_{P1} = \frac{(a \times X3_{CAM} + b \times Y3_{CAM} + c)}{(g \times X3_{CAM} + h \times Y3_{CAM} + 1)} \quad (7)$$

$$Y3_{P1} = \frac{(d \times X3_{CAM} + e \times Y3_{CAM} + f)}{(g \times X3_{CAM} + h \times Y3_{CAM} + 1)} \quad (8)$$

$$X4_{P1} = \frac{(a \times X4_{CAM} + b \times Y4_{CAM} + c)}{(g \times X4_{CAM} + h \times Y4_{CAM} + 1)} \quad (9)$$

$$Y4_{P1} = \frac{(d \times X4_{CAM} + e \times Y4_{CAM} + f)}{(g \times X4_{CAM} + h \times Y4_{CAM} + 1)} \quad (10)$$

Next, the position adjustment device 200 calculates a position corresponding to the feature point Q10 in the first panel coordinate system based on the correspondence relationship calculated in step S34 and the second image data, using the position calculation unit 230 (step S36, and a position calculation step).

Here, it is assumed that a position corresponding to the feature point Q10 in the second panel coordinate system in the R liquid crystal panel 130R is designated as (X1P2, Y1P2), and a position corresponding to the feature point Q10 in the camera coordinate system from the second image data is designated as (X1P2_CAM, Y1P2_CAM). If the position corresponding to the feature point Q10 in the first panel coordinate system is designated as (X1P2_P1, Y1P2_P1), it can be calculated as in the following equations using the correspondence relationships (the parameters a to h) calculated in step S34.

$$X1_{P2\_P1} = \frac{(a \times X1_{P2\_CAM} + b \times Y1_{P2\_CAM} + c)}{(g \times X1_{P2\_CAM} + h \times Y1_{P2\_CAM} + 1)} \quad (11)$$

$$Y1_{P2\_P1} = \frac{(d \times X1_{P2\_CAM} + e \times Y1_{P2\_CAM} + f)}{(g \times X1_{P2\_CAM} + h \times Y1_{P2\_CAM} + 1)} \quad (12)$$

Next, the position adjustment device 200 calculates a misalignment amount which is a difference between the position corresponding to the feature point Q10 in the second panel coordinate system and the position corresponding to the feature point Q10 in the first panel coordinate system, using the misalignment amount calculation unit 240 (step S38, and a misalignment amount calculation step).

$$\Delta x = X1_{P2\_P1} - X1_{P2} \quad (13)$$

$$\Delta y = Y1_{P2\_P1} - Y1_{P2} \quad (14)$$

Thereafter, the position adjustment device 200 calculates an adjustment amount corresponding to the misalignment amount calculated in step S38 using the adjustment amount calculation unit 250 (step S40, and an adjustment amount calculation step). The position adjustment device 200 performs a control for adjusting a position of the R liquid crystal panel 130R in response to an adjustment control signal according to the adjustment amount calculated in step S38, using the position adjustment unit 260 (step S42, and a position adjustment step), and finishes the series of processes (END).

As described above, in this embodiment, regarding at least four feature points P10 to P13, a correspondence relationship between the first panel coordinate system and the camera coordinate system is obtained. Next, a position corresponding to the feature point Q10 in the first panel coordinate system is obtained from the position of at least one feature point Q10 in the second panel coordinate system according to the correspondence relationship. In addition, a position of the R liquid crystal panel 130R displaying the feature point Q10 is adjusted according to a difference between the position of the feature point Q10 in the first panel coordinate system and the original position of the feature point Q10 in the second panel coordinate system. In this way, as shown in FIG. 4A, since at least four feature points P10 to P13 are used, even if the camera is installed to be shifted and tilted with respect to the screen SCR, it is possible to adjust a position of the liquid crystal panel with high accuracy.

Figure 8A:
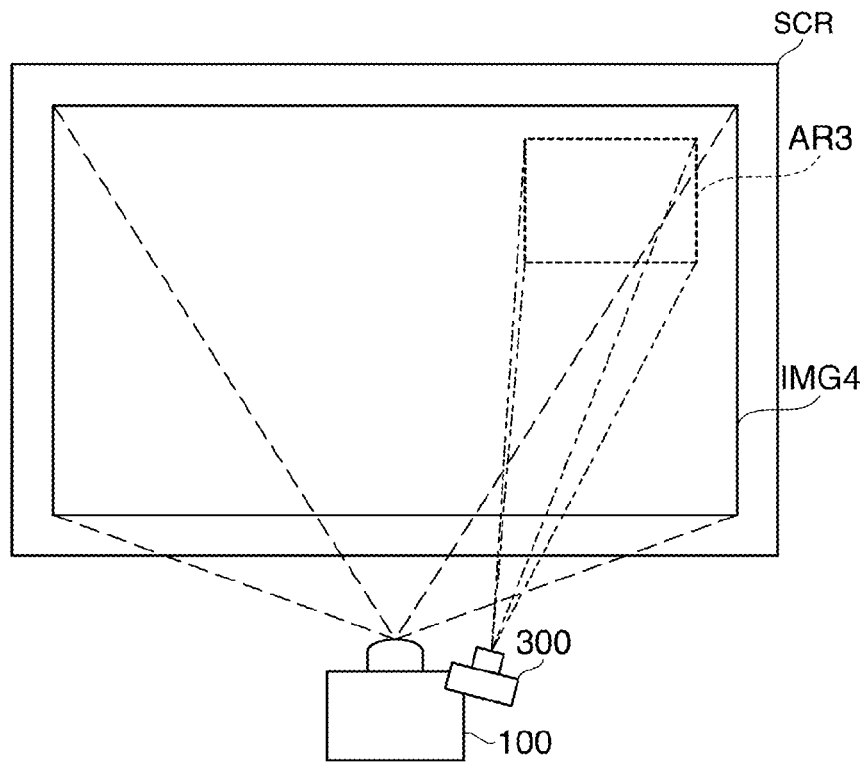
FIGS. 8A and 8B are diagrams illustrating effects according to this embodiment.
Figure 8B:
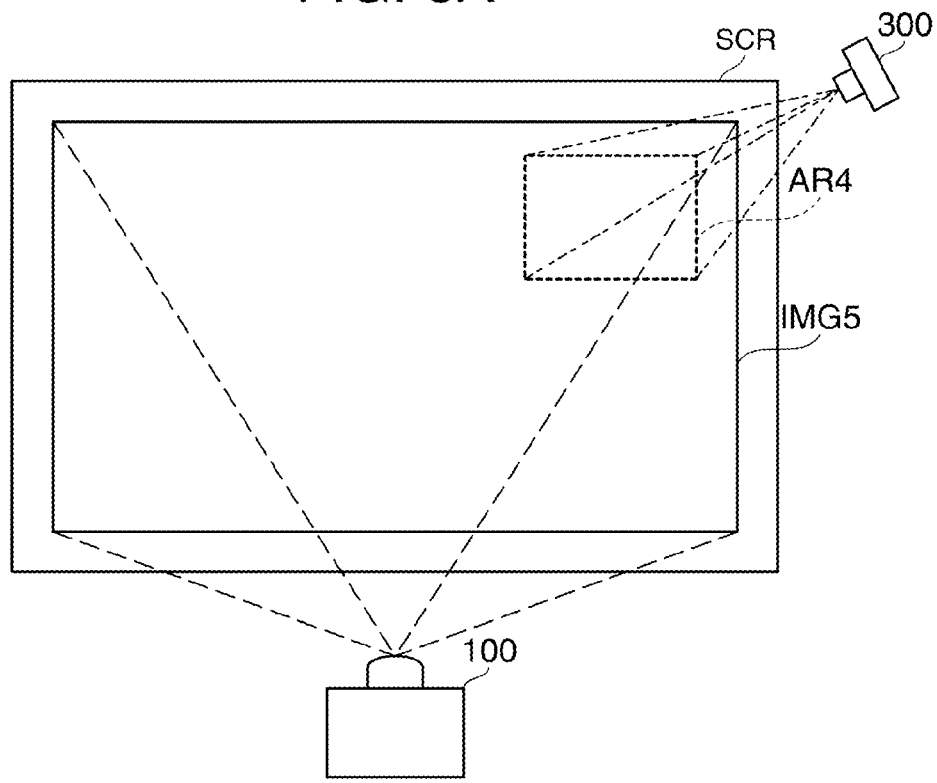

FIGS. 8A and 8B are diagrams illustrating effects achieved by this embodiment. In FIGS. 8A and 8B, the parts corresponding to those in FIG. 1 have the same reference numerals, and the description thereof will be appropriately omitted.

Typically, in a case where a test pattern is imaged, and a position of a liquid crystal panel is adjusted according to a misalignment amount between display positions of display pixels, it is necessary to locate the camera at the front-on position with respect to the screen SCR. For this reason, due to a requirement that the camera is installed so as not to generate shadow of an image projected from the projector, there is a limitation on an installed position of the camera. Thereby, there are problems in that the camera may not be installed at a position close to the screen, a high-definition camera or a zoom lens therefore becomes necessary, and the costs are increased.

In contrast, in this embodiment, even in a case where the camera 300 is installed to be tilted or to be shifted and tilted, or even in a case where an image is distorted, or the like, it is possible to correctly calculate a misalignment amount. Since the degree of freedom in the installation of the camera 300 is increased, it is possible to capture an image at a position close to a test pattern from the outside of the screen SCR even if an installed position is not the front-on position with respect to the screen SCR. This means that the camera 300 can be installed at a position which does not prevent viewing as shown in FIG. 8B, and, as a result, it is possible to improve a calculation accuracy of the misalignment amount due to the image capturing at high magnification.

As shown in FIG. 8A, the camera 300 may be installed at the same position as the projector 100. Therefore, the camera 300 can be embedded in the projector 100, and the device configuration can be miniaturized.

First Modified Example

In this embodiment, although the example where a position of the liquid crystal panel is adjusted by capturing an image of the feature points P10 to P13 and Q10 in one area within an image projected on the screen SCR has been described, the invention is not limited thereto. For example, there may be a configuration in which a plurality of areas are formed in an image projected on the screen SCR, the feature points (first feature points and second feature points) in this embodiment in each area are displayed and imaged, and thus a position of the liquid crystal panel is adjusted.

Figure 9:
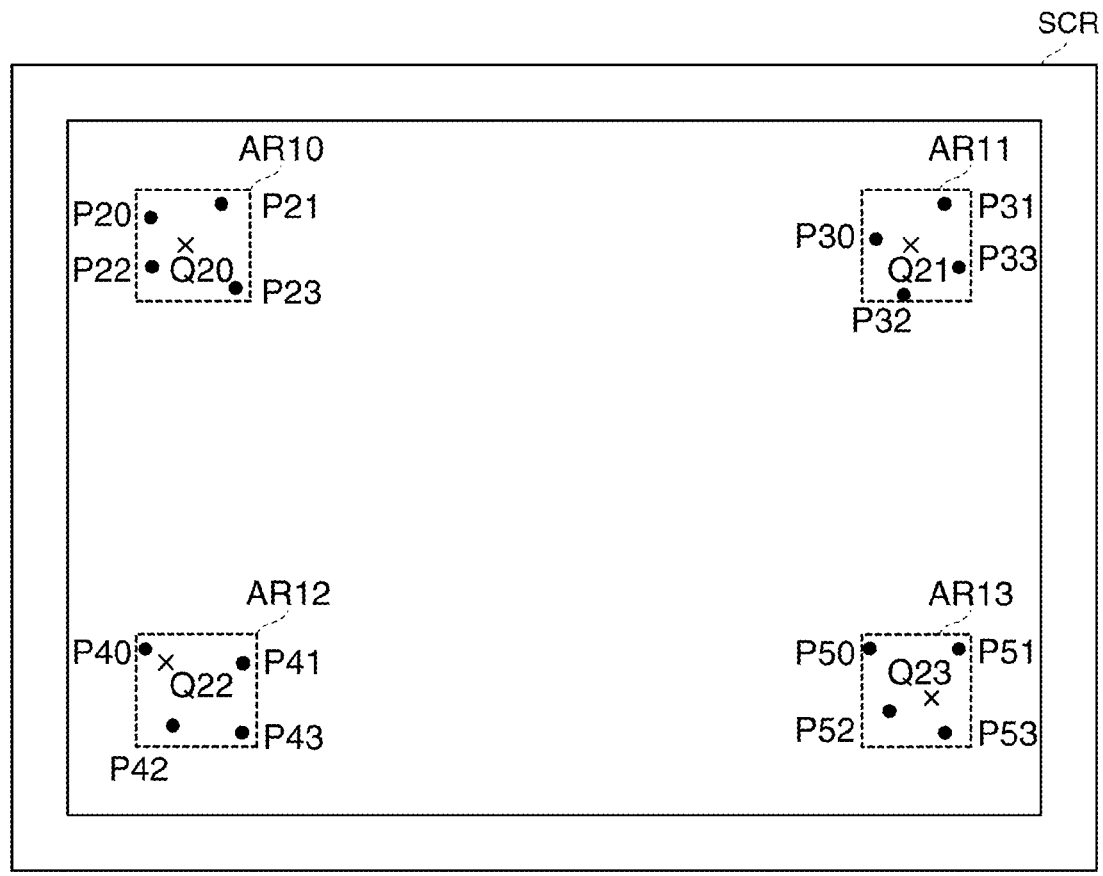
FIG. 9 is a schematic diagram illustrating a test pattern according to a first modified example of this embodiment.

FIG. 9 schematically shows a test pattern according to a first modified example of this embodiment. FIG. 9 shows an example where the first test pattern and the second test pattern overlap with each other such as in the embodiment, in each of four areas disposed around four corners within an image projected by the projector.

In a first area AR10, at least four feature points (feature points P20 to P23 in FIG. 9) are displayed as the first feature points such that no combination of three points exists in a straight line. In addition, in the first area AR10, a feature point Q20 is displayed in an area formed by connecting the feature points P20 to P23 or around the area as the second feature point. In a second area AR11, at least four feature points (feature points P30 to P33 in FIG. 9) are displayed as the first feature points such that no combination of three points exists in a straight line. In addition, in the second area AR11, a feature point Q21 is displayed in an area formed by connecting the feature points P30 to P33 or around the area as the second feature point. In a third area AR12, at least four feature points (feature points P40 to P43 in FIG. 9) are displayed as the first feature points such that no combination of three points exists in a straight line. In addition, in the third area AR12, a feature point Q22 is displayed in an area formed by connecting the feature points P40 to P43 or around the area as the second feature point. In a fourth area AR13, at least four feature points (feature points P50 to P53 in FIG. 9) are displayed as the first feature points such that no combination of three points exists in a straight line. In addition, in the fourth area AR13, a feature point Q23 is displayed in an area, or around the area, formed by connecting the feature points P50 to P53 as the second feature point.

Figure 10:
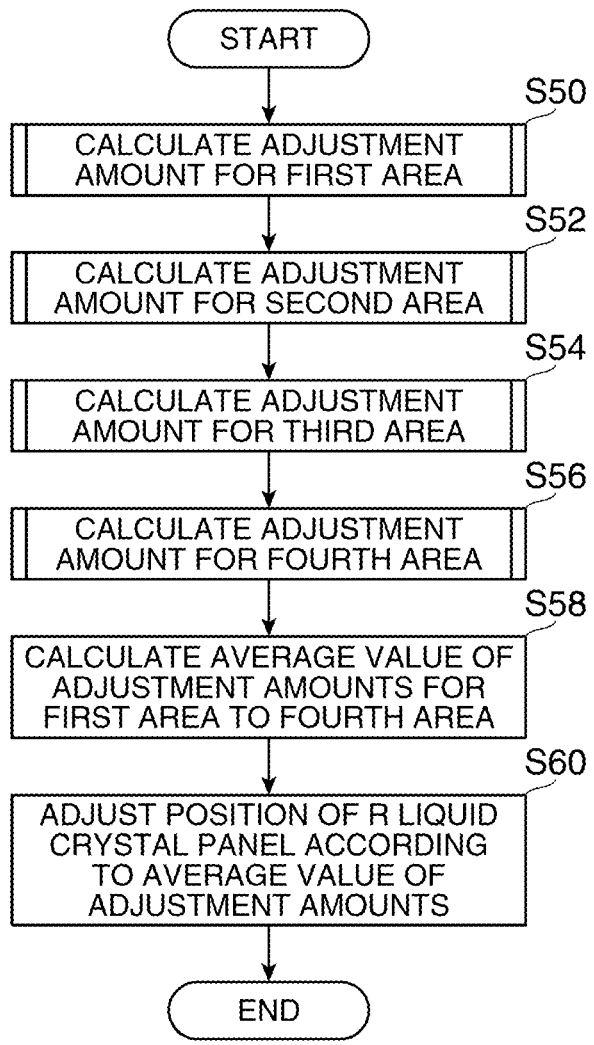
FIG. 10 is a flowchart of a process example in a position adjustment device according to the first modified example.

FIG. 10 shows a flowchart of a process example in a position adjustment device according to the first modified example. In the first modified example as well, the position adjustment device is constituted by ASIC or dedicated hardware, and enables hardware corresponding to each of the units in FIG. 3 to execute a process in each step shown in FIG. 10. Alternatively, the position adjustment device may be constituted by a CPU, ROM, or RAM. In this case, the position adjustment device executes the process in each step shown in FIG. 10 by the CPU, which reads a program stored in the ROM or the RAM, executing a process according to the program.

First, the position adjustment device according to the first modified example calculates an adjustment amount for the first area AR10 (step S50). The process in step S50 is the same as those in steps S30 to S40 shown in FIG. 7. Likewise, the position adjustment device according to the first modified example calculates an adjustment amount for each of the second area AR11 to the fourth area AR13 in the same manner as step S50 (step S52, step S54 and step S56). Next, the position adjustment device according to the first modified example calculates an average value of the adjustment amounts calculated for the respective areas in steps S50 to S56 (step S58). Thereafter, the position adjustment device performs a control for adjusting a position of the R liquid crystal panel 130R according to the average value, calculated in step S58, of the adjustment amounts for the respective areas of the first area AR10 to the fourth area AR13 (step S60), and finishes the series of processes (END).

As described above, in the first modified example of this embodiment, the adjustment amounts for the respective plurality of areas on the screen SCR are calculated, and a position of the liquid crystal panel is adjusted using the adjustment amounts. Thereby, it is possible to adjust a position of the liquid crystal panel with higher accuracy as compared with the case of performing the adjustment based on an adjustment amount obtained for one area. In addition, although the example of adjusting a position of the liquid crystal panel based on the average value of the adjustment amounts for the respective areas has been described in the first modified example, the invention is not limited thereto. For example, an adjustment amount for each area may be weighted according to a shape of a projection image, the number of feature points, a position of each area in the projection image, and the like, and a position of the liquid crystal panel may be adjusted according to an adjustment amount set by the weighting.

Second Modified Example

In this embodiment or the first modified example thereof, although the three-plate type liquid crystal projector in which the liquid crystal panel used as a reference and the liquid crystal panel to be adjusted form one image forming unit has been described as an example, the invention is not limited thereto.

Figure 11:
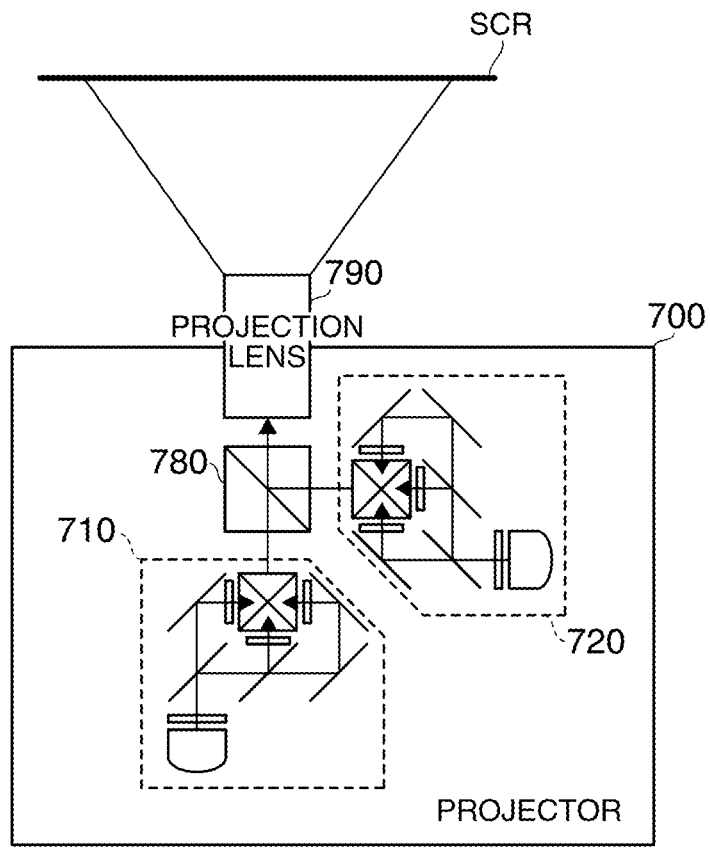
FIG. 11 is a diagram illustrating an outline of a configuration example of a projector according to a second modified example of this embodiment.
Figure 12A:
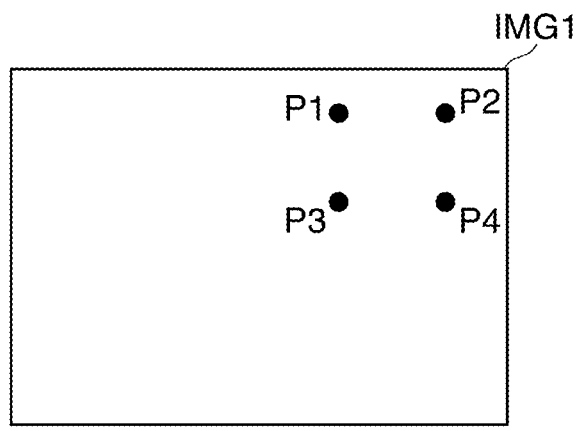
FIGS. 12A and 12B are diagrams illustrating examples of test patterns.
Figure 12B:
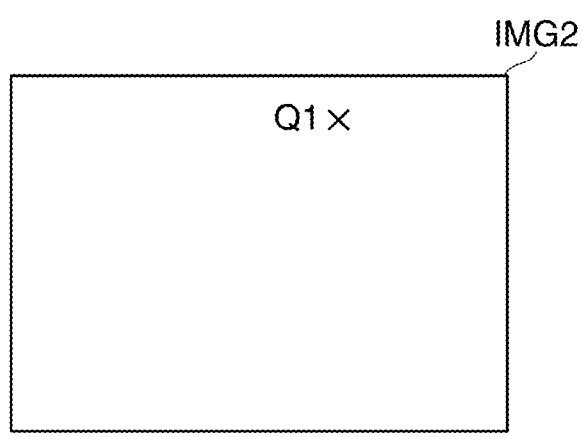
Figure 13A:
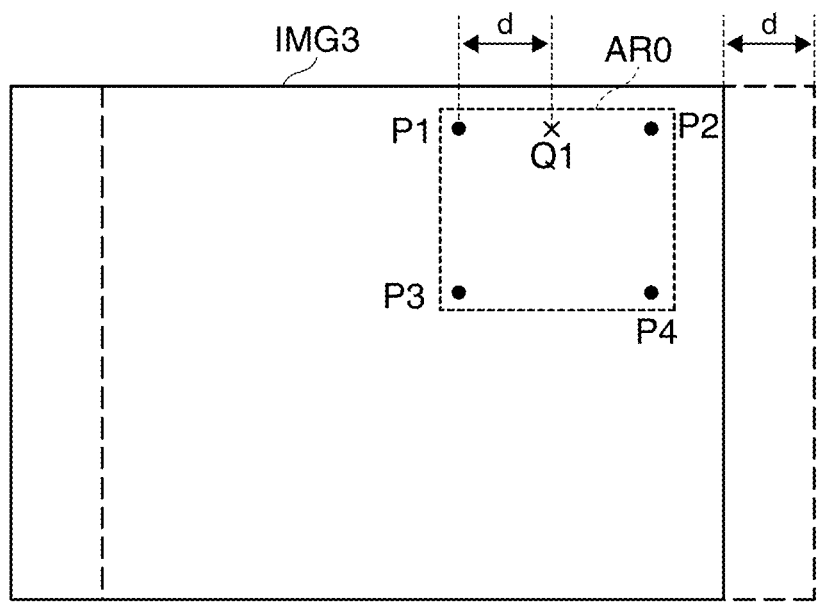
FIGS. 13A and 13b are diagrams illustrating an example where the test pattern in FIG. 12A and the test pattern in FIG. 12B overlap with each other.
Figure 13B:
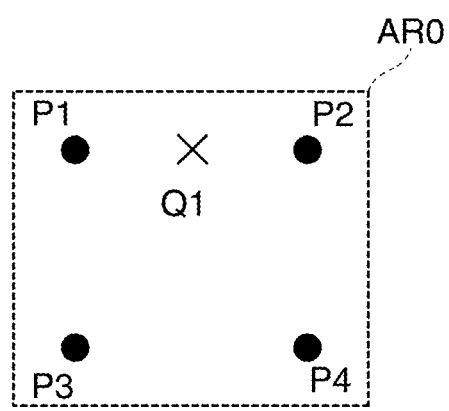
Figure 14:
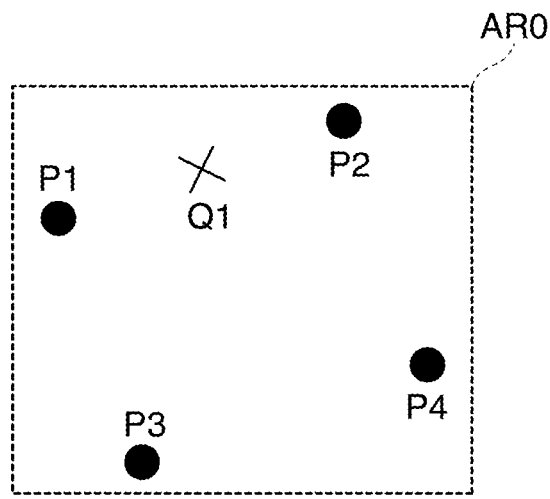
FIG. 14 is a schematic diagram illustrating an example of a captured image obtained by imaging the area in FIG. 13A after the camera is fixed in a tilted state.
Figure 15A:
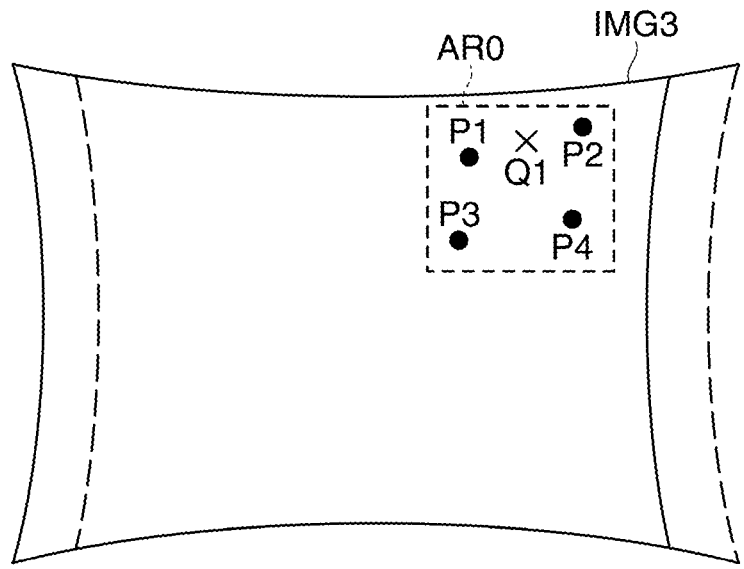
FIG. 15A is a schematic diagram illustrating the distortion of an image projected by a projector.
Figure 15B:
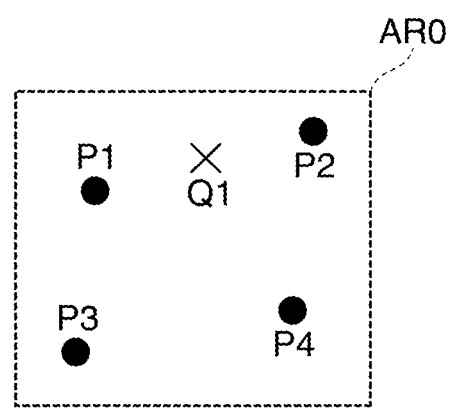
FIG. 15B is a schematic diagram illustrating a captured image obtained by imaging the area in FIG. 15A using the camera.
Figure 16:
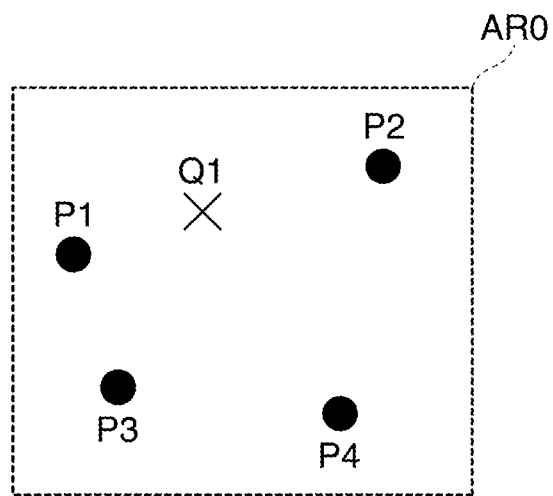
FIG. 16 is a schematic diagram illustrating a captured image obtained by imaging the area using the camera which is installed to be shifted and tilted with respect to the screen.

FIG. 11 shows an outline of a configuration example of a projector according to a second modified example of this embodiment. FIG. 11 shows an outline of a six-plate type liquid crystal projector configuration in which the liquid crystal panel used as a reference and the liquid crystal panel to be adjusted constitute different image forming units.

The projector 700 according to the second modified example includes a first image forming unit 710, a second image forming unit 720, a polarization beam synthesis prism (Polarization Beam Splitter, PBS) 780, and a projection lens 790.

The first image forming unit 710 has a configuration in which the projection lens 170 and the position adjustment mechanism portions 180 and 182 are omitted from the configuration shown in FIG. 2. In other words, the first image forming unit 710 includes the light source 110, the pair of integrator lenses 112 and 114, the polarization conversion element 116, the superposing lens 118, the R dichroic mirror 120R, the G dichroic mirror 120G, and the reflection mirror 122. Further, the first image forming unit 710 includes the R field lens 124R, the G field lens 124G, the R liquid crystal panel 130R, the G liquid crystal panel 130G, and the B liquid crystal panel 130B. Further, the first image forming unit 710 includes the relay optical system 140, and the cross-dichroic prism 160. The first image forming unit 710 and the second image forming unit 720 have the same configuration. The projection lens 790 is the same as the projection lens 170 in FIG. 2.

The projector 700 can display an image on the screen SCR by projecting two images formed by the first image forming unit 710 and the second image forming unit 720 so as to overlap with each other.

In the second modified example, by using the G liquid crystal panel 130G (first light modulation device) of the first image forming unit 710 as a reference, a position of the R liquid crystal panel 130R (second light modulation device) of the second image forming unit 720 is adjusted in the same manner as the above-described embodiment. Here, the second image forming unit 720 has the position adjustment mechanism portion (not shown) which is the same as that in this embodiment and which adjusts a position of the R liquid crystal panel 130R, and adjusts a position of the R liquid crystal panel 130R of the second image forming unit 720 according to a calculated adjustment amount. Alternatively, the second image forming unit 720 may have a position adjustment mechanism portion (not shown) for adjusting a position of the entire second image forming unit 720 using the polarization beam synthesis prism 780 as a reference, and may adjust a position of the entire second image forming unit 720 according to a calculated adjustment amount.

As above, the position adjustment method of the light modulation device, the position adjustment device of the light modulation device, the projector, and the display system have been described based on the embodiment or the modified examples thereof of the invention, however the invention is not limited to the embodiment or the modified example thereof. A variety of aspects can occur without departing from the scope thereof, and thus, for example, the following modifications are possible.

(1) Although the example of adjusting a position of one liquid crystal panel with respect to the liquid crystal panel used as a reference or of adjusting a position of one image forming unit with respect to the image forming unit used as a reference has been mainly described in this embodiment or the modified examples thereof, the invention is not limited thereto. A position of one or a plurality of liquid crystal panels with respect to a liquid crystal panel used as a reference may be adjusted, or a position of one or a plurality of image forming units with respect to an image forming unit used as a reference may be adjusted.

(2) Although the example of adjusting positions of other liquid crystal panels or other image forming units with respect to one liquid crystal panel or one image forming unit used as a reference has been described in this embodiment or the modified examples thereof, the invention is not limited thereto. The invention may be applied to a method of adjusting a position of a liquid crystal panel or an image forming unit with respect to a given reference position.

(3) Although the example where a liquid crystal panel used as a reference or an image forming unit used as a reference and a liquid crystal panel to be adjusted or an image forming unit to be adjusted are included in the same projector has been described in this embodiment or the modified examples thereof, the invention is not limited thereto. The liquid crystal panel used as a reference or the image forming unit used as a reference may be included in a first projector, and other liquid crystal panels or other image forming units may be included in a second projector different from the first projector. Therefore, the invention may be applied to a system which projects one image by overlapping a first image projected by the first projector with a second image projected by the second projector.

(4) Although the example where the projector is constituted by the light modulation devices using the so-called three-plate type transmissive liquid crystal panels has been described in the embodiment or the modified examples thereof, the invention is not limited thereto. For example, a light modulation device may use a two-plate type, four-plate type or more transmissive liquid crystal panels. In addition, although the example where the transmissive liquid crystal panel is used as the light modulation device has been described, the invention is not limited thereto. For example, the invention may be applied to a projector which uses DLP (Digital Light Processing) (registered trademark), LCOS (Liquid Crystal On Silicon), or the like, as the light modulation device.

(5) Although the invention has been described as the position adjustment method of the light modulation device, the position adjustment device of the light modulation device, the projector, and the display system in the embodiment or the modified examples, the invention is not limited thereto. For example, the invention may be applied to a program in which a process procedure of the position adjustment method of the light modulation device or the position adjustment method of the display system, or a recording medium on which one of the programs is recorded.

(6) In above embodiments, the position of projected image is adjusted by adjusting a position of liquid crystal panel which correspond to the projected image. The position of projected image may be adjusted by adjusting image data which correspond to the projected image.

What is claimed is:

1. A method for calculating a position adjustment amount of projected image comprising:
    displaying a first test pattern including at least four first feature points on a projection plane using light modulated by a first light modulation device;
    obtaining first image data by imaging the first feature points displayed on the projection plane using an image capturing device;
    displaying a second test pattern including at least one second feature point on the projection plane using light modulated by a second light modulation device;
    obtaining second image data by imaging the second feature point displayed on the projection plane using the image capturing device;
    calculating correspondence relationships between positions corresponding to the first feature points in a first coordinate system defined in the first light modulation device and positions corresponding to the first feature points in an image-capturing coordinate system defined in the image capturing device, based on the first image data;
    calculating an adjustment amount according to a misalignment amount between a position corresponding to the second feature point in the first coordinate system and a position corresponding to the second feature point in a second coordinate system defined in the second light modulation device, based on the correspondence relationships and the second image data.

2. A method for calculating the position adjustment amount of projected image according to claim 1, further comprising:
    calculating a position corresponding to the second feature point in the first coordinate system based on the correspondence relationships and the second image data; and
    calculating a misalignment amount between the position corresponding to the second feature point in the second coordinate system and the position calculated in the calculating of the position and corresponding to the second feature point in the first coordinate system,
    wherein in the calculating of the adjustment amount, an adjustment amount according to the misalignment amount calculated in the calculating of the misalignment amount is calculated.

3. A method for calculating the position adjustment amount of projected image according to claim 1, wherein in the displaying of the first test pattern, the first test pattern having the first feature points arranged such that no combination of three points exists in a straight line in the projection plane is displayed.

4. A method for calculating the position adjustment amount of projected image according to claim 1, wherein in the displaying of the second test pattern, the second test pattern having the second feature point arranged in an area formed by connecting the first feature points or around the area is displayed.

5. A method for calculating the position adjustment amount of projected image according to claim 1, wherein the adjustment amounts are respectively obtained for a plurality of areas in the projection plane, and a position of at least one of the first light modulation device and the second light modulation device is adjusted based on the plurality of adjustment amounts.

6. A device for calculating a position adjustment amount of projected image comprising:
- a first image data obtaining unit that obtains first image data which is obtained by an image capturing device imaging at least four first feature points which are displayed on a projection plane using light modulated by a first light modulation device;
- a second image data obtaining unit that obtains second image data which is obtained by the image capturing device imaging at least one second feature point which is displayed on the projection plane using light modulated by a second light modulation device;
- a correspondence relationship calculation unit that calculates correspondence relationships between positions corresponding to the first feature points in a first coordinate system defined in the first light modulation device and positions corresponding to the first feature points in an image-capturing coordinate system defined in the image capturing device, based on the first image data; and
- an adjustment amount calculation unit that calculates an adjustment amount according to a misalignment amount between a position corresponding to the second feature point in the first coordinate system and a position corresponding to the second feature point in a second coordinate system defined in the second light modulation device, based on the correspondence relationships and the second image data.

7. A projector comprising:
a first light modulation device;
a second light modulation device;
- a first image data obtaining unit that obtains first image data which is obtained by an image capturing device imaging at least four first feature points which are displayed on a projection plane using light modulated by the first light modulation device;
- a second image data obtaining unit that obtains second image data which is obtained by the image capturing device imaging at least one second feature point which is displayed on the projection plane using light modulated by the second light modulation device;
- a correspondence relationship calculation unit that calculates correspondence relationships between positions corresponding to the first feature points in a first coordinate system defined in the first light modulation device and positions corresponding to the first feature points in an image-capturing coordinate system defined in the image capturing device, based on the first image data;
- an adjustment amount calculation unit that calculates an adjustment amount according to a misalignment amount between a position corresponding to the second feature point in the first coordinate system and a position corresponding to the second feature point in a second coordinate system defined in the second light modulation device, based on the correspondence relationships and the second image data; and
- a position adjustment unit that adjusts a position of at least one of the first light modulation device and the second light modulation device based on the adjustment amount calculated by the adjustment amount calculation unit.

8. The projector according to claim 7, further comprising the image capturing device that images the first feature points and the second feature point.

* * * * *